United States Patent
Rajbhoj et al.

(10) Patent No.: US 10,810,643 B2
(45) Date of Patent: Oct. 20, 2020

(54) METHOD AND SYSTEM FOR REQUEST FOR PROPOSAL (RFP) RESPONSE GENERATION

(71) Applicant: Tata Consultancy Services Limited, Mumbai (IN)

(72) Inventors: Asha Sushilkumar Rajbhoj, Pune (IN); Padmalata Venkata Nistala, Hyderabad (IN); Vinay Kulkarni, Pune (IN); Gomathi Ganesan, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 152 days.

(21) Appl. No.: 16/254,350

(22) Filed: Jan. 22, 2019

(65) Prior Publication Data
US 2020/0126136 A1    Apr. 23, 2020

(30) Foreign Application Priority Data
Oct. 23, 2018    (IN) .............................. 201821039984

(51) Int. Cl.
| | |
|---|---|
| G06Q 30/00 | (2012.01) |
| G06Q 30/06 | (2012.01) |
| G06F 16/93 | (2019.01) |
| G06F 40/242 | (2020.01) |
| G06F 40/30 | (2020.01) |
| G06N 5/02 | (2006.01) |

(52) U.S. Cl.
CPC ......... G06Q 30/0611 (2013.01); G06F 16/93 (2019.01); G06F 40/242 (2020.01); G06F 40/30 (2020.01); G06N 5/02 (2013.01)

(58) Field of Classification Search
None
See application file for complete search history.

(56) References Cited

U.S. PATENT DOCUMENTS

| | | | | |
|---|---|---|---|---|
| 5,802,493 | A  * | 9/1998 | Sheflott .................. | G06F 16/00 705/1.1 |
| 10,282,468 | B2 * | 5/2019 | Kim ........................ | G06F 16/35 |
| 10,528,612 | B2 * | 1/2020 | Di Balsamo .......... | G06F 16/334 |

(Continued)

FOREIGN PATENT DOCUMENTS

WO    WO-2016/180713    11/2016

OTHER PUBLICATIONS

Asha Rajbhoj et al. "A RFP System for Generating Response to a Request for Proposal" © 2019 Association for Computing Machinery, ISEC'19, Feb. 2019, India (Year: 2019).*

(Continued)

*Primary Examiner* — Naeem U Haq
(74) *Attorney, Agent, or Firm* — Finnegan, Henderson, Farabow, Garrett & Dunner LLP

(57) ABSTRACT

This disclosure relates generally to document analysis, and more particularly to a method and system for Request For Proposal (RFP) response generation. In one embodiment, the system automatically generates at least one search query in response to a RFP received as input, searches in at least one reference solution database using the generated search query, finds matching data, filters the matching data based on RFP parameter specific data, and prepares a response document. The response document is then provided as an output of the system, in response to the RFP collected as input.

14 Claims, 7 Drawing Sheets

(56) References Cited

U.S. PATENT DOCUMENTS

| | | | |
|---|---|---|---|
| 2008/0201132 A1 | 8/2008 | Brown et al. | |
| 2009/0076928 A1* | 3/2009 | Hjertonsson | G06Q 30/02 |
| | | | 705/26.1 |
| 2009/0112655 A1* | 4/2009 | Stuhec | G06Q 10/10 |
| | | | 705/7.27 |
| 2012/0041769 A1* | 2/2012 | Dalal | G06Q 10/101 |
| | | | 705/1.1 |
| 2019/0130464 A1* | 5/2019 | Yao | G06F 7/026 |
| 2019/0394238 A1* | 12/2019 | Putz | G06N 20/20 |
| 2020/0057799 A1* | 2/2020 | Dent | G06F 40/137 |

OTHER PUBLICATIONS

Andreas Falkner et al. "Identifying Requirements in Requests for Proposal: A Research Preview" © Springer Nature Switzerland AG 2019, E. Knauss and M. Goedicke (Eds.): REFSQ 2019, LNCS 11412, pp. 176-182, 2019. (Year: 2019).*

* cited by examiner

| \multicolumn{4}{|l|}{ABC's RFP for back office services, Geography US, Unit Energy resource, Offering: F&A} |
|---|---|---|---|
| No | Question | Query | Search result |
| 1 | Briefly describe how supplier will resource to perform services | (concern:Recruitment AND (type:Strategy OR type:Plan)) | Strategy: ./HRTalent/Recruitment/BPSRecruitment/BPS Recruitment Framework.docx<br><br>Strategy: ./HRTalent/Recruitment/Hiring/Talent Acquisition Framework.docx<br><br>Plan: ./HRTalent/Recruitment/Hiring/Background Check Process.docx<br><br>Plan: ./HRTalent/Recruitment/BPSRecruitment/FTE Hiring and Deployment Timeline.docx |
| 2 | Please describe your approach for managing the peaks and troughs in workload such that headcount can be ramped-up quickly when workloads exceed capacity. | (concern:VolumeMangement AND (type:Strategy OR type:Monitor)) OR (concern:Headcount AND (type:Plan)) | Strategy: ./BPS/BPSStaffing/VolumeMangement/Flexible Staffing Model – Technology.docx<br><br>Strategy: ./BPS/BPSStaffing/VolumeMangement/Volume fore casting.docx<br><br>Monitor: ./BPS/BPSStaffing/VolumeMangement/Volume Surge and Drop, Staggered Work Volume Management.docx<br><br>Monitor: ./BPS/BPSStaffing/VolumeMangement/Volume management for Peak volumes and Turnover.docx |

Fig. 5A

| | | | |
|---|---|---|---|
| 3 | Briefly describe how supplier will resource to perform services | (concern:Recruitment AND (type:Strategy OR type:Plan)) | Strategy: ./HRTalent/Recruitment/BPSRecruitment/BPS Recruitment Framework.docx<br><br>Strategy: ./HRTalent/Recruitment/Hiring/Talent Acquisition Framework.docx<br><br>Plan: ./HRTalent/Recruitment/Hiring/Background Check Process.docx<br><br>Plan: ./HRTalent/Recruitment/BPSRecruitment/FTE Hiring and Deployment Timeline.docx |
| 4 | Please describe your approach for managing the peaks and troughs in workload such that headcount can be ramped-up quickly when workloads exceed capacity. | (concern:VolumeMangement AND (type:Strategy OR type:Monitor)) OR (concern:Headcount AND (type:Plan)) | Strategy: ./BPS/BPSStaffing/VolumeMangement/Flexible Staffing Model – Technology.docx<br><br>Strategy: ./BPS/BPSStaffing/VolumeMangement/Volume fore casting.docx<br><br>Monitor: ./BPS/BPSStaffing/VolumeMangement/Volume Surge and Drop, Staggered Work Volume Management.docx<br><br>Monitor: ./BPS/BPSStaffing/VolumeMangement/Volume management for Peak volumes and Turnover.docx |
| | Extract | Search | Save | Generate |

Fig. 5B

2. Please describe your approach for managing the peaks and troughs in workload such that headcount can be ramped-up quickly when workloads exceed capacity.

Response:

We adopt a flexible staffing model for its clients. This will enable quick ramp up/ down of resources to adhere to the fluctuations in the resource demand. As part of this model, TCS maintains core, specialist and flexi teams.

While the priority for the core team is to maintain and mature the knowledge of the systems, the specialist team will provide specialist technical, or business knowledge required during various phases of the project. The flexi team will facilitate ramp-up/ down at short notice and will have multi-skilled associates to enable redeployment in a different role or different component area seamlessly.

Contingency will be managed within the context of the core/ specialist/ flexi model. Succession plans is planned ahead for all key personnel identified.

3. List any third parties or subcontractors whom you would involve in delivery of the Services.

Response

We do not usually outsource or sub-contract work assigned to us by clients. However, if the required capability development is not aligned to the company growth strategy, we may choose to engage partners/ sub-contractors post mutual agreement with the client. The partners/ sub-contractors are selected based on their competency in the required area of work. We have predefined parameters for selecting a partner which involves thorough screening and evaluation.

Fig. 6

METHOD AND SYSTEM FOR REQUEST FOR PROPOSAL (RFP) RESPONSE GENERATION

PRIORITY CLAIM

This U.S. patent application claims priority under 35 U.S.C. § 119 to: India Application No. 201821039984, filed on 23, Oct. 2018. The entire contents of the aforementioned application are incorporated herein by reference.

TECHNICAL FIELD

This disclosure relates generally to document analysis, and more particularly to a method and system for generating response to a Request For Proposal (RFP) document.

BACKGROUND

Request for Proposal (RFP)/Request for Information (RFI) in any industry is a document that solicits proposal, and which at least includes a set of requirements/questions. For example, when different entities/organizations collaborate for a business, one entity (say, client) which is seeking the other entity's support/assistance with some specific work may share own requirements/questions in the form of an RFP/RFI, and the other entity (say, a service provider) which receives the RFP/RFI is expected to provide solution data as response to the questions/requirements in the RFP/RFI. The questions/requirements may vary from one industry to another. For example, an RFP/RFI in Information Technology (IT) industry/domain contain queries/requirements specific to products and/or services in IT domain.

The inventors here have recognized several technical problems with such conventional systems, as explained below. Response to RFP/RFI may be prepared manually. However, with increase in RFP volumes to respond or number of questions/requirements in the RFP/RFI document, time and effort required for preparing the response also increases. There are some systems that are being used for generating responses to RFPs/RFIs. However, the existing systems require user intervention at different stages of data processing associated with the RFP/RFI response generation. The user intervention may cause errors at least in terms of incorrect question interpretations and retrieval of inappropriate solution fragments, as each user may understand and interpret problems and problem domain concepts differently, and this may even affect inputs given to the systems. Further, such user interventions at different stages of RFP/RFI processing may be time consuming, and may affect overall efficiency of the RFP/RFI processing and response generation process.

Further, some of the existing systems are capable of generating proposal response automatically. However, such systems use a similarity based approach, in which received questions are compared with questions stored in a storage space, and appropriate match is selected. The similarity based approach has the disadvantage that it dilutes weightage for domain specific aspects. Certain other systems use Natural Language Processing (NLP) approach for RFP/RFI response generation. Such systems rely on Named Entity based processing of text, which may not work in certain contexts. Another disadvantage of the existing systems is that they only suggest responses/answers matching in responses to questions analyzed, to the user, and further processing the responses/answers maybe a cumbersome task for the user. Further, such systems which are being used for RFP/RFI response generation may have to consider certain customer/RFP specific parameters such as but not limited to type of proposal (RFP/RFI), business unit, geography of business, proposal offering and so on, so as to determine length of response, case studies to be positioned in the response and so on. However, the existing systems which rely on question based algorithms may not be effective for processing such questions.

SUMMARY

Embodiments of the present disclosure present technological improvements as solutions to one or more of the above-mentioned technical problems recognized by the inventors in conventional systems. For example, in one embodiment, a processor-implemented method is provided. In this method, a Request for Proposal (RFP) document and corresponding RFP parameter document are collected as input, via one or more hardware processors. Further, at least one search query is framed based on the RFP document, via the one or more hardware processors, wherein framing of the at least one search query involves: extracting a plurality of requirements from the RFP document, using Natural Language Processing (NLP); generating at least one logical sub-tree for each of the plurality of requirements extracted; extracting Words of Interest (WoI) from each logical sub-tree, by traversing through each logical sub-tree; and applying a matching algorithm on the extracted words of interest of each logical sub-tree. Applying the matching algorithm on the extracted words of interest involves: identifying concern and K-type of each logical sub-tree, using a domain specific dictionary; and generating the at least one search query based on the identified concern and K-type of each logical sub-tree, satisfying a plurality of RFP parameters in the RFP parameter document, by applying at least one query formation rule. Further, at least one reference solution database is searched using the at least one search query, via the one or more hardware processors, and matching solution fragments from the at least one reference solution database are extracted. Further, using the extracted solution fragments, a response document is composed, via the one or more hardware processors.

In another embodiment, a system is provided. The system includes, one or more communication interfaces; a memory module storing a plurality of instructions; a Natural Language Processing (NLP) engine; a search engine; a document engine; and one or more hardware processors coupled to the memory module via the one or more communication interfaces. The one or more hardware processors are configured by the instructions to collect a Request for Proposal (RFP) document and corresponding RFP parameter document as input and frame at least one search query based on the RFP document. Framing of the at least one search query involves: extracting a plurality of requirements from the RFP document, using Natural Language Processing (NLP); generating at least one logical sub-tree for each of the plurality of requirements extracted; extracting Words of Interest (WoI) from each logical sub-tree, by traversing through each logical sub-tree; and applying a matching algorithm on the extracted words of interest of each logical sub-tree. Applying the matching algorithm further involves identifying concern and K-type of each logical sub-tree and satisfying RFP parameters, using a domain specific dictionary; and generating the at least one search query based on the identified concern and K-type of each logical sub-tree, by applying at least one query formation rule. The system then searches in at least one reference solution database using the at least one search query, and extracts matching solution fragments from the at least one reference solution database. Further, a response document is composed using the extracted solution fragments.

In yet another embodiment, a non-transitory computer readable medium for generating response to a Request for Proposal (RFP) is provided. The non-transitory computer readable medium collects a Request for Proposal (RFP) document and corresponding RFP parameter document as input. Further, at least one search query is framed based on the RFP document, wherein framing of the at least one search query involves: extracting a plurality of requirements from the RFP document, using Natural Language Processing (NLP); generating at least one logical sub-tree for each of the plurality of requirements extracted; extracting Words of Interest (WoI) from each logical sub-tree, by traversing through each logical sub-tree; and applying a matching algorithm on the extracted words of interest of each logical sub-tree. Applying the matching algorithm on the extracted words of interest involves: identifying concern and K-type of each logical sub-tree, using a domain specific dictionary; and generating the at least one search query based on the identified concern and K-type of each logical sub-tree, by applying at least one query formation rule. Further, at least one reference solution database is searched using the at least one search query, and matching solution fragments from the at least one reference solution database are extracted. Further, using the extracted solution fragments, a response document is composed, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A and 5B depict an example implementation depicting RFP questions provided as input, corresponding search queries generated, and search results generated by the system of FIG. 1, in accordance with some embodiments of the present disclosure.

FIG. 6 depicts a final response document corresponding to the RFP questions provided as input in FIGS. 5A and 5B, by the system of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Request for Proposal (RFP)/Request for Information (RFI) in any industry is a document that solicits proposal/information, and which at least includes a set of requirements/questions. The embodiments disclosed herein are related to a method and a system for automatically processing RFP/RFI in order to generate response to the RFP/RFI. For explanation purpose, details of processing an RFP document for generating the response is explained in the specification as well as in claims. However, it is to be noted that the same mechanism can be used to generate a response to a RFI document (or any other similar document) as well.

Figure 1:
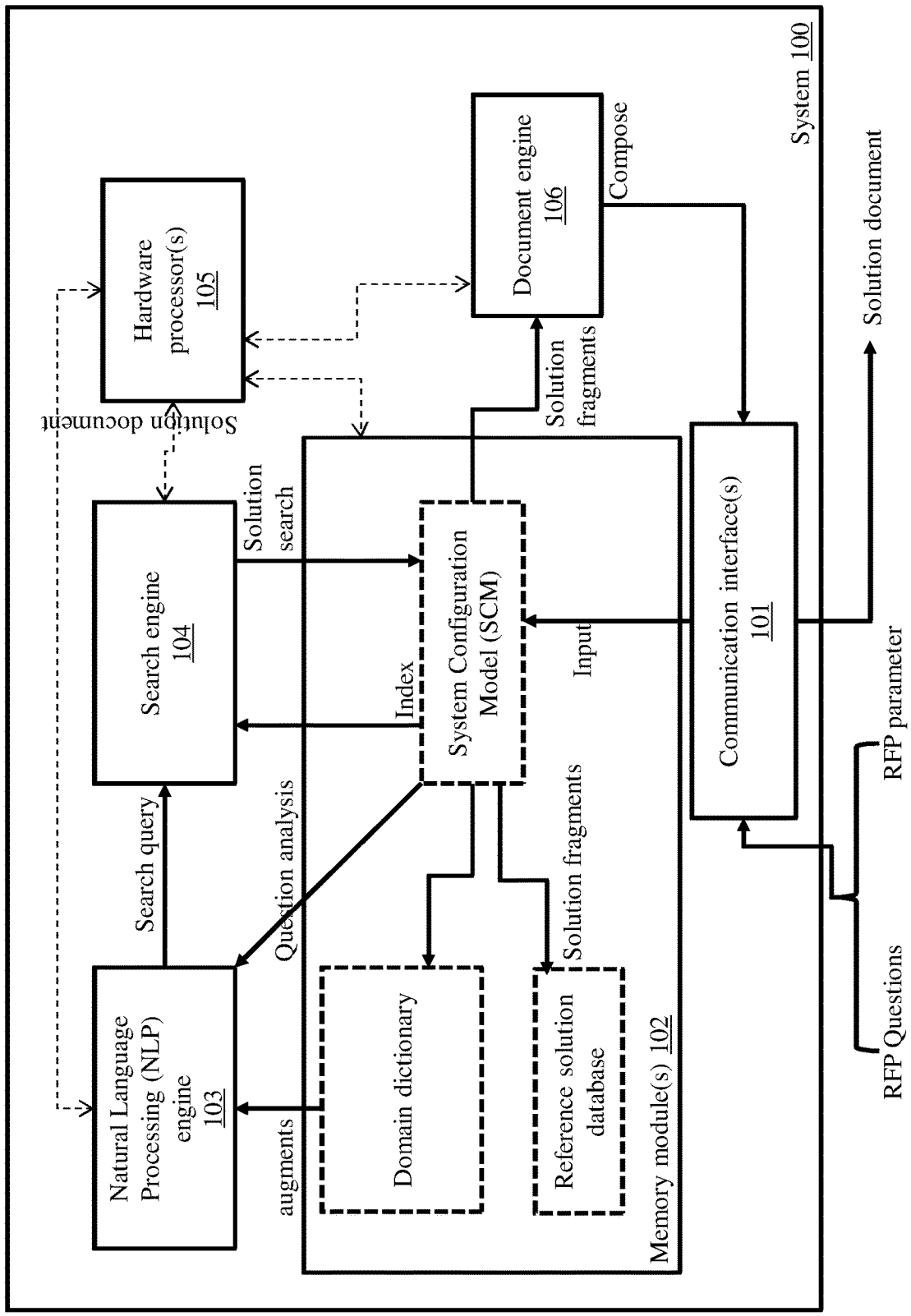
FIG. 1 illustrates an exemplary system for generating RFP response document, according to some embodiments of the present disclosure.

FIG. 1 illustrates an exemplary system for generating RFP response document, according to some embodiments of the present disclosure. The system 100 includes a one or more communication interfaces 101, at least one memory module 102, a Natural Language Processing (NLP) engine 103, a search engine 104, at least one hardware processor 105, and a document engine 106.

The communication interface(s) 101 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 101 can include one or more ports for connecting a number of devices to one another or to another server. In the system 100, the communication interface(s) 101 can be configured to provide appropriate interface(s) and/or channels for a user to interact with the system to perform one or more permitted actions. For example, an authorized user can access the system 100 through the communication interface(s) 101 to provide data to a System Configuration Model (SCM). In another example, the communication interface(s) 101 allows one or more users to feed a RFP document and a RFP parameter document as inputs to the system 100. Further, the system 100 may use the communication interface(s) 101 to provide a composed response document as output to the user. The communication interface(s) 101 may be further configured to provide appropriate channels and interfaces (depicted as dotted as well as thick lines in FIG. 1) for different components of the system 100 to communicate with one another.

The system 100 can be configured to collect, using the communication interface(s) 101, at least one RFP question (may be in the form of a RFP document) and one or more RFP parameters (in a RFP parameter document), as input. The one or more RFP parameters individually or in any suitable combination, may represent at least one context in which the at least one RFP question is being asked. Some examples of such RFP parameters are type of process, geography, customer, offering and unit and so on. All such data may be stored in the memory module(s) 102 and may further fed to the NLP engine 103, the search engine 104, and to any other component of the system 100 for further processing.

The memory module(s) 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module(1) 102 stores a plurality of instructions which when executed, cause the one or more hardware processors 105 to perform one or more actions and corresponding data processing associated with the RFP response generation being handled by the system 100. In an embodiment, the plurality of instructions maybe part of a System Configuration Model (SCM) which is stored in the memory module(s). The SCM may further include data such as domain subject areas or concerns along with domain dictionaries, RFP parameters, and reusable solution knowledge documents for various business and technology domains of Information Technology (IT) or any other services, which may be configured by one or more subject matter experts using appropriate interface and options provided using the communication interface(s) 101. The instructions and data that together form the SCM controls and coordinate all the data processing involved in the RFP response generation being handled by the system 100. In an embodiment, the SCM may be generated using a modeling technology. The memory module 102 may also store a domain dictionary that contains data pertaining to domain specific parameters (such as but not limited to terms, and synonyms) pertaining to at least one domain. The domain dictionary maybe augmented to the NLP engine 103. The memory module 102 may also be configured to update data stored, at least based on the data obtained from the communication interface(s) 101. The memory module 102 also includes a reference solution database which is used to store solution fragments and/or the response document extracted in response to a RFP document collected by the system 100. In addition to the domain dictionary, the SCM, and the reference solution database, the memory module(s) 102 may store any other data associated with the RFP response generation being handled by the system 100. The memory module 102 may also store the RFP parameters specified in the RFP parameter document, in one or more associated databases.

Figure 3:
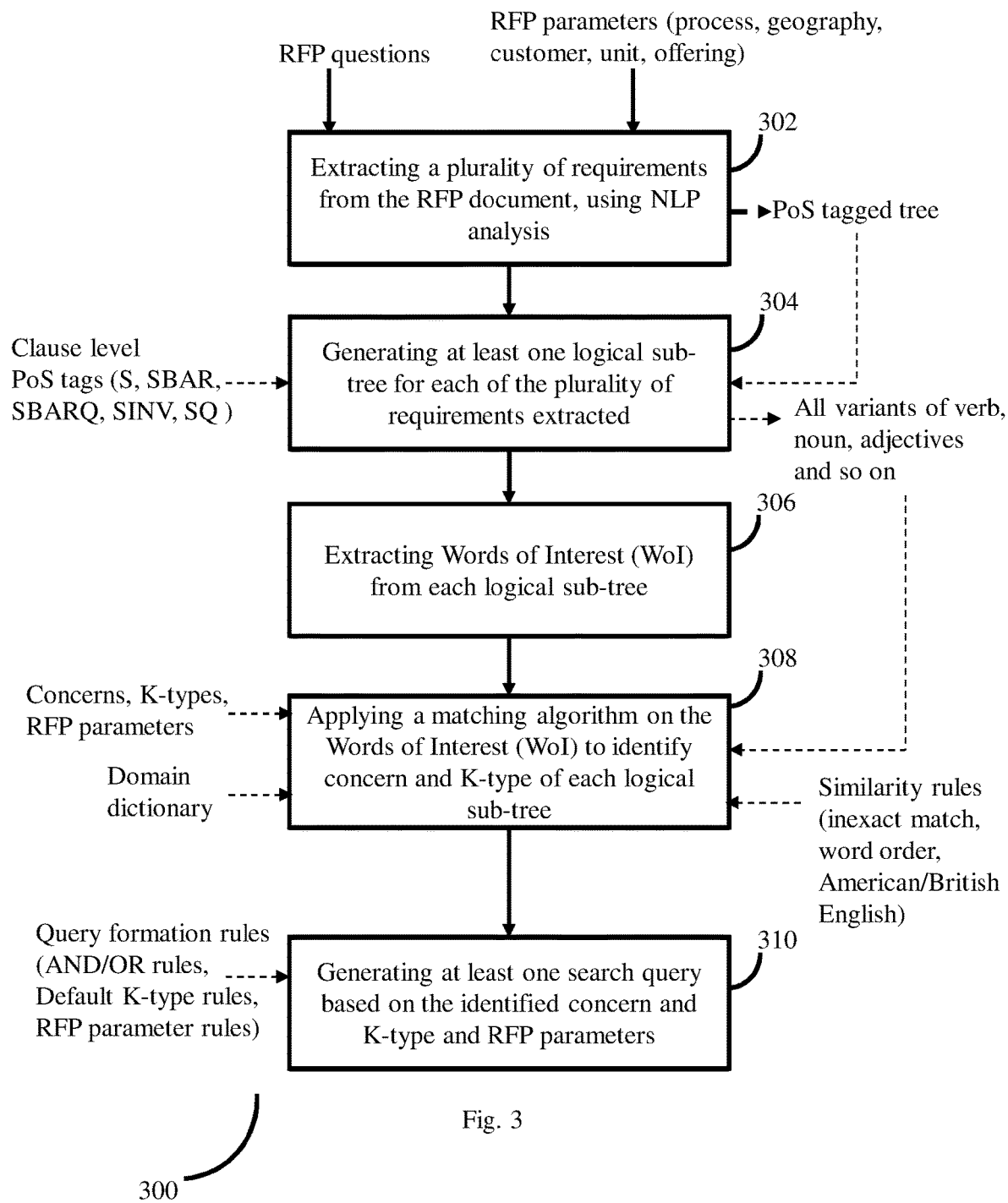
FIG. 3 is a flow diagram depicting steps involved in the process of generating at least one search query by processing the RFP document collected as input, using the system of FIG. 1, in accordance with some embodiments of the present disclosure.

The NLP engine 103 can be configured to process the RFP questions and the RFP parameters, at least in light of the domain dictionary, to generate at least one search query corresponding to at least one RFP document collected as input by the system 100, using the process explained in FIG. 3 description. The NLP engine 103 is further configured to feed the generated at least one search query as input to the search engine 104.

The search engine 104 is configured to collect the at least one search query from the NLP engine 103 as input. The search engine further searches in at least one reference solution database (which may be internally or externally associated with the memory module 102), and retrieve (by performing a solution search) one or more solution fragments matching the at least one search query. The search engine 104 is further configured to feed the one or more solution fragments as input to the SCM in the memory module(s) 102. The SCM then feeds the one or more RFP documents questions, RFP parameters and corresponding solution fragments as input to the document engine 106.

Figure 4:
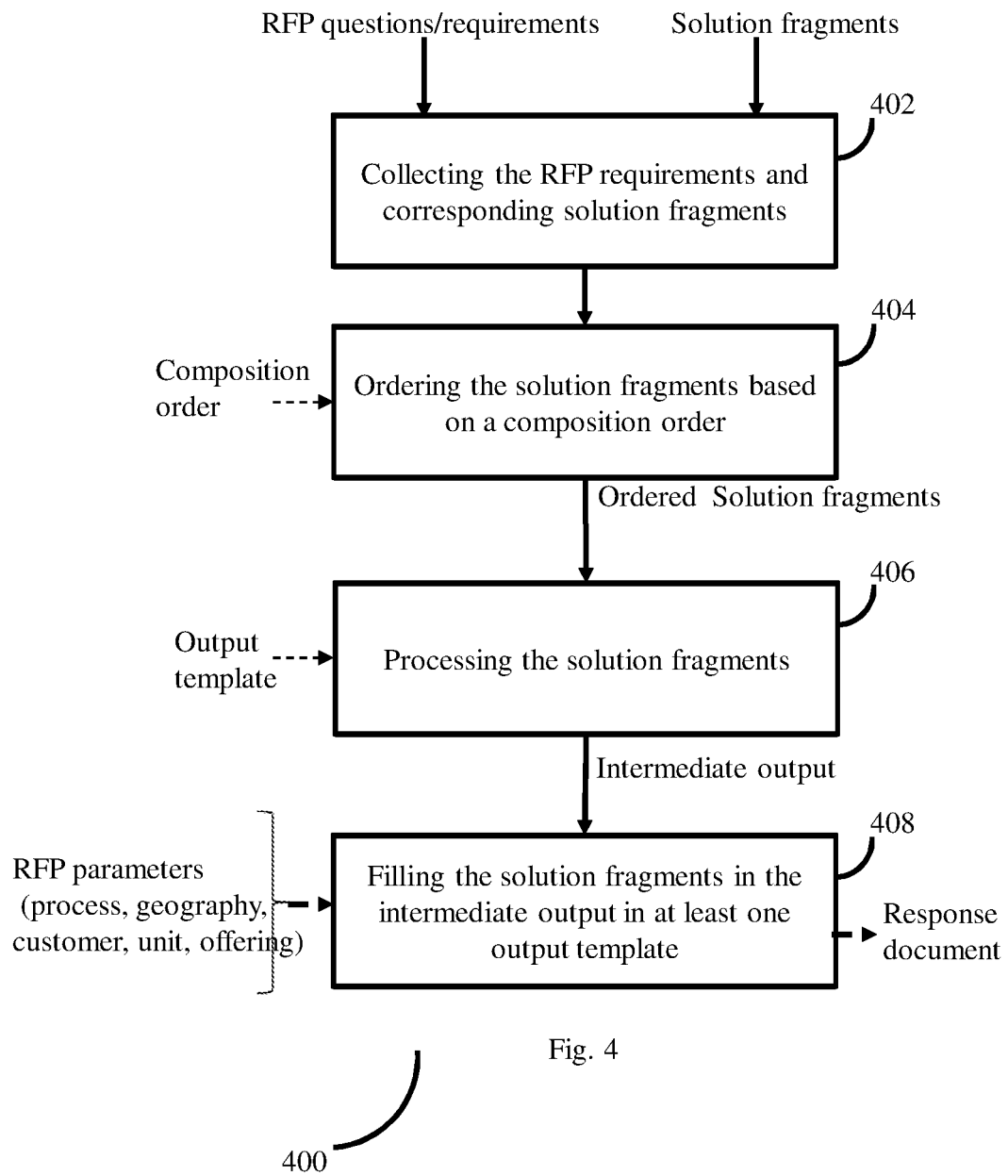
FIG. 4 is a flow diagram depicting steps involved in the process of composing a RFP response document in response to an RFP document collected as input, using the system of FIG. 1, in accordance with some embodiments of the present disclosure.

The document engine 106 is configured to collect the one or more RFP documents questions, RFP parameters and the corresponding solution fragments, and further process the collected data to generate at least one RFP response document (also referred to as 'response document'), based on the process explained in FIG. 4 description.

The one or more hardware processors 105 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 105 may be configured to interact with, perform data processing associated with one or more functionalities being handled by the other components of the system 100, at different stages of the RFP response generation being performed by the system 100.

Figure 2:
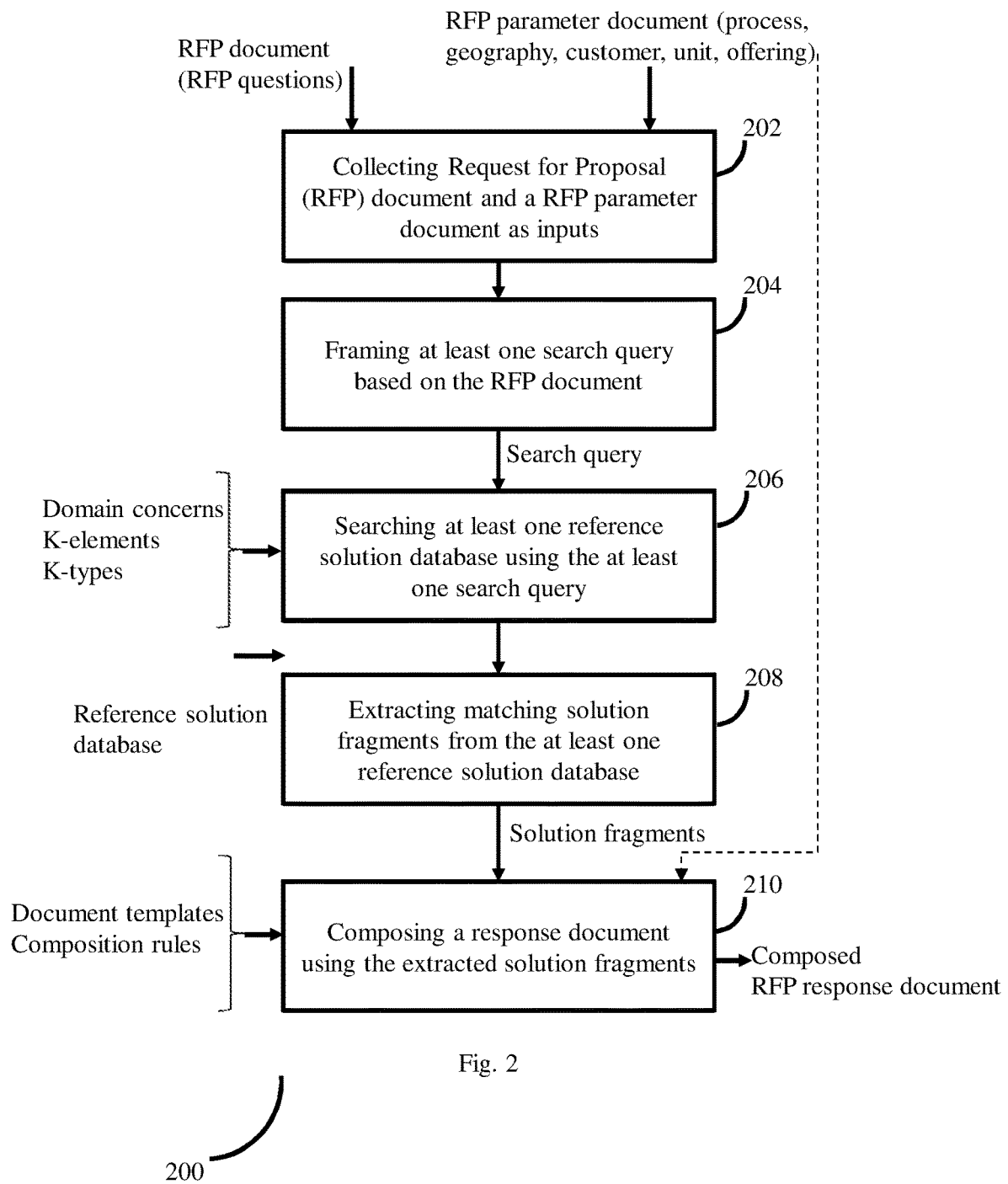
FIG. 2 is a flow diagram depicting steps involved in the process of generating a response to a RFP document collected as input, using the system of FIG. 1, according to some embodiments of the present disclosure.

FIG. 2 is a flow diagram depicting steps involved in the process of generating a response to a RFP document collected as input, using the system of FIG. 1, according to some embodiments of the present disclosure. A Request for Proposal (RFP) document is collected (202) as input by the system 100. In an embodiment, the system 100 may be able to collect and process more than one RFP document at a time. However, for explanation purpose, a single RFP document is considered. This does not intent to limit scope of the embodiments in any manner. The system 100 collects along with the RFP document, a RFP parameter document with one or more RFP parameters, as input. Some examples of the RFP parameters are type of process (RFP, RFI and so on), geography (USA, UK, Europe, and so on), customer, offering (accounting, billing and so on) and unit (banking, insurance, retail and so on), which alone or in any suitable combination may represent one or more contexts in which the queries/requirements in the RFP document(s) are asked/populated.

By processing the RFP document, at least one search query is framed/formed (204) by the system 100. In an embodiment, context specific information matching the RFP document (which is represented using the one or more RFP parameters) also is used (processed along with the RFP document) by the system 100 while framing the at least one search query. Further, at least one reference solution database is searched (206) using the at least one search query, and all matching solution fragments are extracted (208). Different types of data such as but not limited to K-types, K-elements, RFP parameters and domain concerns also are collected and used by the system 100 while querying the at least one reference solution database to identify the matching solution fragments. In an embodiment, the at least one reference solution database is a modelled solution repository, which stores for each domain, data such as but not limited to domain subject areas (concerns), solution types (K-types), one or more domain dictionaries, a plurality of RFP parameters, and solution fragments matching queries and the RFP parameters. In an embodiment, the system 100 may be configured to identify different solution fragments as matching/relevant, for the same question/requirement, based on one or more RFP parameters (for example, unit retail, offering billing) related to the question/requirement. A few examples of such RFP parameters that alone or in combination maybe considered by the system 100 while interpreting the questions/requirements in the RFP document are geography, type of process, business unit from which the RFP is obtained, and so on. For example, result of the search i.e. the solution fragments extracted maybe displayed to the user as shown in FIGS. 5A and 5B. In the depicted example, first column is question number, and second column displays the loaded questions from RFP. Search queries formulated by the system are depicted in column 3. Column 4 depicts results corresponding to each search performed, in which each solution fragment retrieved is linked with corresponding document content.

Further, using the extracted solution fragments, a response document is composed (210) by the system 100. The system 100 collects data pertaining at least to document templates and various composition rules, at this stage, to compose the response document. An example of the response document generated by the system 100 is depicted in FIG. 6. In various embodiments, the steps of method 200 may be performed in the same order as depicted in FIG. 2 or in a different order.

FIG. 3 is a flow diagram depicting steps involved in the process of generating at least one search query corresponding to an RFP document, using the system of FIG. 1, in accordance with some embodiments of the present disclosure. Initially, the RFP document is processed and parsed using appropriate Natural Language Processing (NLP) techniques to extract (302) a plurality of requirements from the RFP document. In an embodiment, one or more RFP parameters (in terms of parameters such as but not limited to process, geography, customer, and unit), also are processed along with the RFP document while framing the search queries.

Further, corresponding to each of the plurality of requirements extracted, the system 100 generates (304) at least one logical sub-tree. Each RFP question may have multiple sentences asking different information. In order to have better mapping of concerns and type instead of processing whole question text, parts of text are processed by dividing tree into the logical sub-trees. In an embodiment, the logical sub-trees are identified using POS (Parts of Speech) clause level tags—S (Sentence), SBAR (subordinating conjunction), SBARQ (subordinating conjunction question), SINV (Inverted declarative sentence), and SQ (Inverted yes/no question). Further, at least one matching algorithm is executed/applied (308) on each of the logical sub-trees. The matching algorithm may be chosen by the system based on one or more similarity rules (may be based on inexact match, word order, language and so on). Further, the matching algorithm(s) being used maybe augmented with domain specific dictionaries, so as to handle terminological variations of domain concerns, and also k-types. To identify and extract (306) one or more streams of Words of Interest (WoI), each logic sub-tree is programmatically traversed and the WOIs are extracted with corresponding POS tags starting with NN (noun), VB (verb), JJ (adjective), and RB (adverb). This is done by considering all variants of noun, verb, adjective and adverb POS tags. For each logical sub-tree, applicable concerns and K-types are identified by matching domain specific vocabulary of input concerns and knowledge types. Vocab string matching is done using fuzzy matching rules supporting both US and UK English. If vocab entry is multi-word, then matching may be done ignoring the order of words. To handle inexact matching, two words matching out of three words in any order is also considered as a match. To formulate query using the identified concern, and K-type list for each logical sub-tree, the following query formation rules may be applied. 1) If more than one logical sub-tree extracts the same concern then merge K-types of the two logical sub-trees and form a single query, 2) Combine K-types of a concern using "AND" expression, 3) combine different concerns using 'OR' clause, satisfying the RFP parameters: business unit or service offering, 4) If query extraction retrieves Case as a K-type, then add RFP parameter information to query using "AND" expression to position suitable case study.

Further, based on the identified at least one concern and K-type, at least one search query is generated (310). In an embodiment, one or more query formation rules are used so as to formulate the at least one search query.

An example depicting the aforementioned steps in framing the search query is given in FIGS. 5A and 5B. Questions depicted in column 2 of FIGS. 5A and 5B are inputs to the system 100, and the queries depicted in column 3 of FIGS. 5A and 5B are framed by the system 100. These queries are further used by the system 100 to perform search in associated reference solution databases and retrieve solution fragments, depicted in column 4 of FIGS. 5A and 5B. In various embodiments, the steps of method 300 may be performed in the same order as depicted in FIG. 3 or in a different order.

FIG. 4 is a flow diagram depicting steps involved in the process of composing a response document in response to an RFP document collected as input, using the system of FIG. 1, in accordance with some embodiments of the present disclosure. Inputs for composing the response document are, but not limited to, RFP questions and the corresponding solution fragments identified/selected, which are collected (402) as input. The system 100 also collects one or more composition orders as input, along with the RFP questions and the solution fragments. In an embodiment, one or more composition rules specifying the composition orders are selected and applied based on type of Ktypes of the solution fragments. By applying the one or more composition orders, the system orders (404) the solution fragments in specific order(s). For example if the solution elements are of type Case, Method and Overview then they are composed in the following order: Overview, Method, Case. Overview is always placed at the beginning and Case at the end. In another example, K-type Offering is added first, followed by Strategy, and K-type Case study is added towards the end of response for a question.

The ordered solution fragments are further processed (406) by the system 100 to generate an intermediate output comprising the solution fragments. At this stage, the system 100 fetches and uses one or more output templates, and accordingly arranges, sorts, and formats the solution fragments according to the one or more output templates and/or one or more RFP parameters. Further, the solution fragments in the intermediate output are filled (408) in the at least one output template to generate at least one response document. Different styles and formats matching selected one or more output templates maybe considered by the system 100 at this stage. In various embodiments, the templates maybe fetched by the system 100 as per one or more pre-configured/dynamically defined criteria, or may be a manual selection as per requirements (at least in terms of styles and format in each template). In another embodiment, each template uses various place holder variables, wherein variables in the templates and solution fragment are populated with details pertaining to the RFP parameter specific information. An example of a response document generated is depicted in FIG. 6.

In various embodiments, the steps of method 400 may be performed in the same order as depicted in FIG. 4 or in a different order.

Experimental Results:

Consider the table below:

TABLE 1

| | RFP/RFI | RFP Parameters | | | Validation | | |
| | | Unit | Geography | Service Offering | Number of Questions | Query Score | Query Precision |
|---|---|---|---|---|---|---|---|
| 1 | RFP | Utilities | UK | Meter to Cash | 16 | 13.5 | 84.4% |
| 2 | RFP | Manufacturing | US | Finance & accounting | 17 | 15.08 | 88.7% |
| 3 | RFI | Lifescience | Europe | Pharmaco vigelence | 17 | 15.44 | 90.8% |
| 4 | RFP | telecommunication | ANZ | Customer experience management | 26 | 21.733 | 83.6% |
| 5 | RFP | HiTech | APAC | Finance and Accounting | 57 | 40.09 | 70.3% |
| 6 | RFI | Government | India | Data quality check | 21 | 18.667 | 88.9% |
| 7 | RFP | Utilities | US | Managed Services | 25 | 18.083 | 72.3% |
| 8 | RFP | Utilities | US | Legal Process Services | 20 | 16 | 80.0% |

The system 100 was used for validation on a set of RFP/RFIs consisting various RFP parameters: different business units, various geographies and service offerings. The RFP questions are fed into the platform for response generation. For each question, the generated query is validated in terms of relevance of retrieved concerns and a 'query score' was given: lowest value being 0 and highest value being 1. Further, summation of query score for all questions of RFP is computed. Precision with which the system 100 generated responses to the queries is represented as 'Query precision' and was calculated as:

Query Precision=Sum (Query score)/Number of RFP questions     (1)

As indicated by the values in Table. 1, the query precision was observed as ranging between 70% and 90% for the selected set of RFPs.

A few other advantages of the system 100 from RFP response generation perspective are:
1. Reduction in error due to incorrect question interpretations and retrieval of inappropriate solution fragments, primarily due to people understanding gaps in understanding of problem domain concepts
2. Reduction in overall time consumption (by automatically generating RFP responses and by providing accessibility to information)
3. Offers flexibility in solution formulation by providing composition of solution fragments The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
collecting (202) a Request for Proposal (RFP) document and a RFP parameter document as inputs, via one or more hardware processors;
framing (204) at least one search query based on the RFP document and the RFP parameter document, via the one or more hardware processors, comprising:
   extracting (302) a plurality of requirements from the RFP document, using Natural Language Processing (NLP);
   generating (304) at least one logical sub-tree for each of the plurality of requirements extracted;
   extracting (306) Words of Interest (WoI) from each logical sub-tree, by traversing through each logical sub-tree; and
   applying (308) a matching algorithm on the extracted words of interest of each logical sub-tree, comprising:
      identifying concern and K-type of each logical sub-tree, satisfying a plurality of RFP parameters in the RFP parameter document, using a domain specific dictionary; and
      generating the at least one search query based on the identified concern and K-type of each logical sub-tree, by applying at least one query formation rule;
searching (206) at least one reference solution database using the at least one search query, via the one or more hardware processors;
extracting (208) matching solution fragments from the at least one reference solution database, via the one or more hardware processors; and
composing (210) a response document using the extracted solution fragments, via the one or more hardware processors.

2. The method as claimed in claim 1, wherein the domain specific dictionary is pre-configured.

3. The method as claimed in claim 1, wherein the at least one reference solution database comprises domain specific data further comprising a plurality of subject areas (concerns), a plurality of solution fragments, a plurality of K-types, and RFP parameter specific data.

4. The method as claimed in claim 3, wherein each of the plurality of solution fragments is stored as a K-type data comprising at least one strategy, at least one fact, and at least one case study.

5. The method as claimed in claim 1, wherein composing the response document comprises:
collecting (402) the plurality of requirements extracted from the RFP document (RFP requirements), and the corresponding solution fragments;
ordering (404) the collected solution fragments based on a composition order;
processing (406) the solution fragments to generate an intermediate output; and
filling (408) the intermediate output in at least one output template, based on one or more RFP parameters.

6. A system 100, comprising:
one or more communication interfaces 101;
a memory module 102 storing a plurality of instructions;
a Natural Language Processing (NLP) engine 103;
a search engine 104;
a document engine (106); and
one or more hardware processors 105 coupled to the memory module 102 via the one or more communication interfaces 101, wherein the one or more hardware processors 105 are configured by the instructions to:
collect (202) a Request for Proposal (RFP) document and a RFP parameter document as inputs, using the one or more communication interfaces 101;
frame (204) at least one search query based on the RFP document and the RFP parameter document, using the NLP engine 103, by:
   extracting (302) a plurality of requirements from the RFP document, using Natural Language Processing (NLP);
   generating (304) at least one logical sub-tree for each of the plurality of requirements extracted;
   extracting (306) Words of Interest (WoI) from each logical sub-tree, by traversing through each logical sub-tree; and
   applying (308) a matching algorithm on the extracted words of interest of each logical sub-tree, comprising:
      identifying concern and K-type of each logical sub-tree, satisfying a plurality of RFP parameters in the RFP parameter document, using a domain specific dictionary; and
      generating the at least one search query based on the identified concern and K-type of each logical sub-tree, by applying at least one query formation rule;
search (206) in at least one reference solution database using the at least one search query, using the search engine 104;
extract (208) matching solution fragments from the at least one reference solution database, using the search engine 104; and
compose a response document using the extracted solution fragments, using the document engine 106.

7. The system 100 as claimed in claim 6, wherein said system is configured maintain domain specific data further comprising a plurality of subject areas (concerns), a plurality of solution fragments, and RFP parameter specific data, in the at least one reference solution database.

8. The system 100 as claimed in claim 7, wherein the system is configured to store each of the plurality of solution fragments as a K-type data comprising at least one strategy, at least one fact, and at least one case study.

9. The system 100 as claimed in claim 6, wherein the document engine 106 composes the response document by:
collecting (402) the plurality of requirements extracted from the RFP document (RFP requirements), and the corresponding solution fragments;
ordering (404) the collected solution fragments based on a composition order;
processing (406) the solution fragments to generate an intermediate output; and
filling (408) the intermediate output in at least one output template, based on one or more RFP parameters.

10. A non-transitory computer readable medium embodying a program executable in a computing device for contract management, comprising:
a program code for collecting (202) a Request for Proposal (RFP) document and a RFP parameter document as inputs, via one or more hardware processors;
a program code for framing (204) at least one search query based on the RFP document and the RFP parameter document, via the one or more hardware processors, comprising:

extracting (302) a plurality of requirements from the RFP document, using Natural Language Processing (NLP);

generating (304) at least one logical sub-tree for each of the plurality of requirements extracted;

extracting (306) Words of Interest (WoI) from each logical sub-tree, by traversing through each logical sub-tree; and applying (308) a matching algorithm on the extracted words of interest of each logical sub-tree, comprising:

identifying concern and K-type of each logical sub-tree, satisfying a plurality of RFP parameters in the RFP parameter document, using a domain specific dictionary; and generating the at least one search query based on the identified concern and K-type of each logical sub-tree, by applying at least one query formation rule;

a program code for searching (206) at least one reference solution database using the at least one search query, via the one or more hardware processors;

a program code for extracting (208) matching solution fragments from the at least one reference solution database, via the one or more hardware processors; and a program code for composing (210) a response document using the extracted solution fragments, via the one or more hardware processors.

11. The non-transitory computer readable medium as claimed in claim 10, wherein the domain specific dictionary is pre-configured.

12. The non-transitory computer readable medium as claimed in claim 10, wherein the at least one reference solution database comprises domain specific data further comprising a plurality of subject areas (concerns), a plurality of solution fragments, a plurality of K-types, and RFP parameter specific data.

13. The non-transitory computer readable medium as claimed in claim 12, wherein each of the plurality of solution fragments is stored as a K-type data comprising at least one strategy, at least one fact, and at least one case study.

14. The non-transitory computer readable medium as claimed in claim 10, wherein composing the response document comprises:

collecting (402) the plurality of requirements extracted from the RFP document (RFP requirements), and the corresponding solution fragments;

ordering (404) the collected solution fragments based on a composition order;

processing (406) the solution fragments to generate an intermediate output; and filling (408) the intermediate output in at least one output template, based on one or more RFP parameters.

\* \* \* \* \*